United States Patent
Wu et al.

(10) Patent No.: US 10,418,668 B2
(45) Date of Patent: Sep. 17, 2019

(54) ELECTROLYTE SYSTEM INCLUDING COMPLEXING AGENT TO SUPPRESS OR MINIMIZE METAL CONTAMINANTS AND DENDRITE FORMATION IN LITHIUM ION BATTERIES

(71) Applicant: GM Global Technology Operations LLC, Detroit, MI (US)

(72) Inventors: Qiang Wu, Shanghai (CN); Zhiqiang Yu, Shanghai (CN); Haijing Liu, Shanghai (CN); Honggu Pan, Shanghai (CN); Ion C. Halalay, Grosse Pointe Park, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 139 days.

(21) Appl. No.: 15/644,444

(22) Filed: Jul. 7, 2017

(65) Prior Publication Data

US 2019/0013552 A1    Jan. 10, 2019

(51) Int. Cl.
    *H01M 10/42*        (2006.01)
    *H01M 10/0525*      (2010.01)
    (Continued)

(52) U.S. Cl.
    CPC ....... *H01M 10/4235* (2013.01); *H01M 4/505* (2013.01); *H01M 4/525* (2013.01);
    (Continued)

(58) Field of Classification Search
    CPC ......... H01M 10/0525; H01M 10/0567; H01M 10/0568; H01M 10/0569; H01M 10/4235; H01M 4/505; H01M 4/525; H01M 4/587
    (Continued)

(56) References Cited

U.S. PATENT DOCUMENTS

| 4,530,963 A | 7/1985 | DeVoe et al. |
| 4,670,363 A | 6/1987 | Whitney et al. |

(Continued)

FOREIGN PATENT DOCUMENTS

| CN | 101803066 A | 8/2010 |
| CN | 102130361 A | 7/2011 |

(Continued)

OTHER PUBLICATIONS

Plichta et al., A low-temperature electrolyte for lithium and lithium-ion batteries, Jun. 2000, Journal of Power Sources, 88, 192-196 (Year: 2000).*

(Continued)

*Primary Examiner* — Sean P Cullen
(74) *Attorney, Agent, or Firm* — Harness, Dickey & Pierce, P.L.C.

(57) ABSTRACT

Electrochemical cells that cycle lithium ions and methods for suppressing or minimizing dendrite formation are provided. The electrochemical cells include a positive electrode, a negative electrode, and a separator sandwiched therebetween. The positive and negative electrodes and separator may each include an electrolyte system comprising one or more lithium salts, one or more solvents, and one or more complexing agents. The one or more complexing agents binds to metal contaminants found within the electrochemical cell to form metal ion complex compounds that minimize or suppress formation of dendrite protrusions on the negative electrode at least by increasing the horizontal area (e.g., decreasing the height) of any dendrite formation.

15 Claims, 6 Drawing Sheets

(51) Int. Cl.
   *H01M 10/0567* (2010.01)
   *H01M 4/587* (2010.01)
   *H01M 4/505* (2010.01)
   *H01M 4/525* (2010.01)
   *H01M 10/0569* (2010.01)
   *H01M 10/0568* (2010.01)

(52) U.S. Cl.
   CPC ....... *H01M 4/587* (2013.01); *H01M 10/0525* (2013.01); *H01M 10/0567* (2013.01); *H01M 10/0568* (2013.01); *H01M 10/0569* (2013.01); H01M 2300/004 (2013.01)

(58) Field of Classification Search
   USPC .................................................. 429/188, 332
   See application file for complete search history.

(56) References Cited

U.S. PATENT DOCUMENTS

| | | | |
|---|---|---|---|
| 5,130,211 | A | 7/1992 | Wilkinson et al. |
| 6,218,055 | B1 * | 4/2001 | Shah ..................... H01M 4/582 |
| | | | 429/215 |
| 6,689,513 | B1 | 2/2004 | Morigaki et al. |
| 7,022,812 | B2 | 4/2006 | Yoshimura et al. |
| 7,282,109 | B2 | 10/2007 | Takata et al. |
| 8,349,031 | B2 | 1/2013 | Take et al. |
| 8,455,140 | B1 | 6/2013 | Huang et al. |
| 8,460,591 | B2 | 6/2013 | Huang et al. |
| 8,460,829 | B1 | 6/2013 | Huang et al. |
| 8,470,468 | B2 | 6/2013 | Xiao et al. |
| 8,470,898 | B2 | 6/2013 | Huang |
| 8,568,930 | B2 | 10/2013 | Halalay et al. |
| 8,663,840 | B2 | 3/2014 | Nazri et al. |
| 8,765,301 | B2 | 7/2014 | Halalay et al. |
| 8,785,054 | B2 | 7/2014 | Halalay et al. |
| 8,835,058 | B2 | 9/2014 | Kia et al. |
| 8,951,654 | B2 | 2/2015 | Sachdev et al. |
| 8,974,946 | B2 | 3/2015 | Cai et al. |
| 8,993,646 | B2 | 3/2015 | Huang |
| 8,999,584 | B2 | 4/2015 | Jiang et al. |
| 9,023,520 | B2 | 5/2015 | Halalay et al. |
| 9,028,565 | B2 | 5/2015 | Huang |
| 9,077,038 | B2 | 7/2015 | Halalay et al. |
| 9,093,705 | B2 | 7/2015 | Xiao et al. |
| 9,123,939 | B2 | 9/2015 | Xiao et al. |
| 9,130,231 | B2 | 9/2015 | Halalay et al. |
| 9,138,932 | B2 | 9/2015 | Huang |
| 9,142,830 | B2 | 9/2015 | Xiao et al. |
| 9,153,819 | B2 | 10/2015 | Huang et al. |
| 9,160,036 | B2 | 10/2015 | Yang et al. |
| 9,172,075 | B2 | 10/2015 | Kia et al. |
| 9,287,540 | B2 | 3/2016 | Huang |
| 9,324,984 | B2 | 4/2016 | Huang et al. |
| 9,331,323 | B2 | 5/2016 | Huang |
| 9,346,066 | B2 | 5/2016 | Huang |
| 9,350,046 | B2 | 5/2016 | Huang |
| 9,362,542 | B2 | 6/2016 | Halalay et al. |
| 9,362,551 | B2 | 6/2016 | Sachdev et al. |
| 9,362,552 | B2 | 6/2016 | Sohn et al. |
| 9,406,971 | B2 | 8/2016 | Kia et al. |
| 9,412,986 | B2 | 8/2016 | Huang |
| 9,455,430 | B2 | 9/2016 | Huang et al. |
| 9,525,600 | B1 | 12/2016 | Shen |
| 9,537,144 | B2 | 1/2017 | Huang et al. |
| 9,742,028 | B2 | 8/2017 | Zhou et al. |
| 9,799,916 | B2 | 10/2017 | Halalay et al. |
| 9,865,854 | B2 | 1/2018 | Fuller et al. |
| 10,008,749 | B2 | 6/2018 | Luski et al. |
| 10,050,313 | B2 | 8/2018 | Luski et al. |
| 2006/0194118 | A1 | 8/2006 | Yew et al. |
| 2007/0238001 | A1 * | 10/2007 | Koyama ................. H01B 1/122 |
| | | | 429/480 |
| 2010/0143769 | A1 | 6/2010 | Lee et al. |
| 2010/0239900 | A1 | 9/2010 | Take et al. |
| 2011/0117413 | A1 | 5/2011 | Wang et al. |
| 2011/0151333 | A1 | 6/2011 | Halalay et al. |
| 2011/0165459 | A1 | 7/2011 | Halalay et al. |
| 2011/0200863 | A1 | 8/2011 | Xiao et al. |
| 2012/0007560 | A1 * | 1/2012 | Smart ..................... H01M 6/164 |
| | | | 320/127 |
| 2012/0102725 | A1 | 5/2012 | Fuller et al. |
| 2012/0156568 | A1 | 6/2012 | Kia et al. |
| 2012/0229096 | A1 | 9/2012 | Nazri |
| 2012/0231321 | A1 | 9/2012 | Huang et al. |
| 2012/0308872 | A1 | 12/2012 | Huang |
| 2012/0309860 | A1 | 12/2012 | Huang |
| 2012/0315384 | A1 | 12/2012 | Abd Elhamid et al. |
| 2013/0004857 | A1 | 1/2013 | Kia et al. |
| 2013/0052509 | A1 | 2/2013 | Halalay et al. |
| 2013/0071742 | A1 | 3/2013 | Halalay et al. |
| 2013/0115519 | A1 | 5/2013 | Lee et al. |
| 2013/0130093 | A1 | 5/2013 | Wang et al. |
| 2013/0131200 | A1 | 5/2013 | Huang |
| 2013/0149588 | A1 * | 6/2013 | Garsuch ............. H01M 2/1673 |
| | | | 429/144 |
| 2013/0183582 | A1 | 7/2013 | Halalay et al. |
| 2013/0284338 | A1 | 10/2013 | Xiao et al. |
| 2013/0319599 | A1 | 12/2013 | Huang |
| 2014/0220233 | A1 | 8/2014 | Huang et al. |
| 2014/0242452 | A1 | 8/2014 | Pieczonka et al. |
| 2014/0272526 | A1 | 9/2014 | Huang |
| 2014/0272558 | A1 | 9/2014 | Xiao et al. |
| 2015/0014890 | A1 | 1/2015 | Kiao |
| 2015/0037651 | A1 | 2/2015 | Huang |
| 2015/0056492 | A1 | 2/2015 | Huang |
| 2015/0093626 | A1 | 4/2015 | Fuller et al. |
| 2015/0093628 | A1 | 4/2015 | Halalay et al. |
| 2015/0093639 | A1 | 4/2015 | Halalay et al. |
| 2016/0111721 | A1 | 4/2016 | Xiao et al. |
| 2016/0226109 | A1 | 8/2016 | Angerbauer et al. |
| 2016/0344035 | A1 * | 11/2016 | Zhamu ................... H01M 4/628 |
| 2016/0372788 | A1 * | 12/2016 | Cheng ............... H01M 10/0525 |
| 2016/0372789 | A1 * | 12/2016 | Cheng ............... H01M 10/0525 |
| 2017/0155175 | A1 | 6/2017 | Halalay et al. |
| 2018/0026307 | A1 * | 1/2018 | Jeon .................. H01M 10/0567 |
| | | | 429/338 |
| 2019/0013548 | A1 | 1/2019 | Halalay et al. |
| 2019/0013551 | A1 | 1/2019 | Halalay et al. |

FOREIGN PATENT DOCUMENTS

| | | | |
|---|---|---|---|
| CN | 102437371 A * | 5/2012 | |
| CN | 102447111 A | 5/2012 | |
| CN | 102668171 A | 9/2012 | |
| CN | 104518190 A | 4/2015 | |
| CN | 104638215 A | 5/2015 | |
| CN | 105161754 A | 12/2015 | |
| CN | 105914401 A * | 8/2016 | |
| CN | 106816626 A | 6/2017 | |
| CN | 107528085 A | 12/2017 | |
| CN | 107528086 A | 12/2017 | |
| CN | 109216634 A | 1/2019 | |
| CN | 109216766 A | 1/2019 | |
| DE | 102013218681 A1 | 3/2015 | |
| DE | 102014113894 A1 | 4/2015 | |
| DE | 102016122403 A1 | 6/2017 | |
| DE | 102017113276 A1 | 12/2017 | |
| DE | 102017113282 A1 | 12/2017 | |
| DE | 102018116492 A1 | 1/2019 | |
| DE | 102018116493 A1 | 1/2019 | |
| EP | 1120850 A1 * | 8/2001 | ............. H01M 4/13 |
| JP | S59031571 A | 2/1984 | |
| JP | 07211351 A * | 8/1995 | |
| WO | WO-2016104895 A1 * | 6/2016 | ........ H01M 10/0567 |
| WO | WO-2017120884 A1 | 7/2017 | |

OTHER PUBLICATIONS

Banerjee, et al.; "Review—Multifunctional Materials for Enhanced Li-Ion Batteries Durability: A Brief Review of Practical Options";

(56) References Cited

OTHER PUBLICATIONS

Journal of the Electrochemical Society, 164 (1); Jan. 5, 2017; pp. A6315-A6323.
Ziv, et al. "Manganese Sequestration and Li-Ion Batteries Durability Enhancement by Polymeric 18-Crown-6 Ethers"; Journal of the Electrochemical Society, 161 (9); May 21, 2014; pp. A1213-A1217.
Walkowiak, et al., Macrocycle Carriers for Separation of Metal Ions in Liquid Membrane Process—A Review, Desalination 240, 1999, pp. 186-197.
Komaba, et al., Inorganic Electrolyte Additives to Suppress the Degradation of Graphite Anodes by Dissolved Mn(II) for Lithium-Ion Batteries, Journal of Power Sources 119-121, 2003, pp. 378-382.
Shahrisa, et al., CHemistry of Pyrones, Part 3: New Podands of 4H-Pyran-4-ones; 5 Molecules, 2000, pp. 200-207.
Bruening, et al., Understanding Cation-Macrocycle Binding Selectivity in Single-Solvent Extractions, and Liquid Membrane Systems by Quantifying Thermodynamic Interations; Cation Binding by Macrocycles, Chapter 2, 1990, pp. 112-113, Marcel Dekkerinc., New York and Basel.
Kaifer, et al., Redox Control of Cation Binding in Macrocyclic Systems; Cation Binding by Macrocycles, 1990, Chapert 8, p. 364, Marcel Dekker Inc., New York and Basel.
Atwood, et al., Cation Complexation by Calizarenes; Cation Binding by Macrocycles, 1990, Chapter 15, pp. 581-582, 587; Marcel Dekker Inc., New York and Basel.
Toner, et al., Modern Aspects of Host-Guest Chemistry: Molecular Modeling and Conformationally Restricted Hosts; Crown Ethers and Analogs, 1989, Chapter 3, pp. 81-83, John Wiley and Sons, New York.
Vogtle, et al., Crown-ether-complexes and Selectivity; Crown Ethers and Analogs, 1989, Chapter 4, pp. 208-215, John Wiley and Sons, New York.
Weber, E., New Developments in Crown Ether Chemistry: Lariats, Spherands, and Second-Sphere Complexes; Crown Ethers and Analogs, 1989, Chapter 5, pp. 306-307, 309, 314-315, 320-321, John Wiley and Sons, New York.
Arora, et al., Battery Separators, Chem. Rev. 104, 2004, pp. 4419-4462.
"Teijin Develops More Heat-Resistant Li-Ion Battery Separator", Trading Markets.Com, Sep. 10, 2009, 3 pages, http://www.tradingmarkets.com.
Plastics Today Staff, "TonenGeneral and Toray team up to create lithium-ion battery separator films", plasticstoday.com, Nov. 4, 2009, 2 pages, http://www.plasticstoday.com.
Montanari, F., et al., "Hydroxymethyl Derivatives of 18-Crown-6 and [2.2.2] Cryptand: Versatile Intermediates for the Synthesis of Lipophilic and Polymer-Bonded Macrocyclic Ligands," J. Org. Chem, 1982, 47, 1298-1302.
Babb, D. A., "Synthesis and Metal Ion Complexation of Synthetic Ionophores," A Ph.D. Dissertation in Chemistry, Texas Tech University, Dec. 1985, 149 pages.
Manecke, G., et al., "Polymere Kryptanden, 1", Makromol. Chem. 182, 1973-1984, (1981).
Kopolow, S., et al., "Polyvinyl macrocyclic polyethers). Synthesis and Cation Binding Properties", vol. 6, No. 1, Jan.-Feb. 1973, pp. 133-142.
Smid, J., et al., "Synthesis of 4'-Vinylbenzocrown Ethers", Organic Preparations and Procedures Int. 8(4), 1976, pp. 193-196.
Banerjee, et al.; "Increasing the durability of Li-ion batteries by means of manganese ion trapping materials with nitrogen functionalities"; Journal of Power Sources 341 (2017); pp. 457-465.
Banerjee, et al.; "Multifunctional Manganese Ions Trapping and Hydrofluoric Acid Scavenging Separator for Lithium Ion Batteries Based on Poly (ethylene-alternate-maleic acid) Dilithium Salt"; Advanced Energy Materials; 2016; 9 pages.
Halalay et al.; U.S. Appl. No. 15/644,422, filed Jul. 7, 2017 entitled "Polymeric Ion Traps for Suppressing or Minimizing Transition Metal Ions and Dendrite Formation or Growth in Lithium-Ion Batteries"; 43 pages.
Luski et al.; U.S. Appl. No. 15/186,526, filed Jun. 19, 2016 entitled "Lithium Ion Battery"; 74 pages.
Luski et al.; U.S. Appl. No. 15/186,525, filed Jun. 19, 2016 entitled "Lithium Ion Battery"; 65 pages.
Halalay et al.; U.S. Appl. No. 15/644,436, filed Jul. 7, 2017 entitled "Iron Ion Trapping Van Der Waals Gripper Additives for Electrolyte Systems in Lithium-Ion Batteries"; 54 pages.
First Office Action for Chinese Patent Application No. 201410642253.9 dated May 24, 2016 with English language machine translation, 15 pages.
First Office Action for Chinese Patent Application No. 201611028544.4 dated Oct. 17, 2018 with correspondence from China Patent Agent H.K. Ltd dated Oct. 19, 2018 summarizing contents, 9 pages.
First Office Action for Chinese Patent Application No. 201710434173.8 dated Feb. 22, 2019 with English language machine translation, 28 pages.
First Office Action for Chinese Patent Application No. 201710434249.7 dated Feb. 22, 2019 with English language machine translation, 21 pages.
Wikipedia contributors. "Ionophore." Wikipedia, The Free Encyclopedia. Wikipedia, The Free Encyclopedia, Aug. 30, 2012. Web. (downloaded on Mar. 20, 2018).
Wikipedia contributors. "Siderophore." Wikipedia, The Free Encyclopedia. Wikipedia, The Free Encyclopedia, Aug. 16, 2012. Web. (downloaded on Mar. 20, 2018).

* cited by examiner

ELECTROLYTE SYSTEM INCLUDING COMPLEXING AGENT TO SUPPRESS OR MINIMIZE METAL CONTAMINANTS AND DENDRITE FORMATION IN LITHIUM ION BATTERIES

INTRODUCTION

This section provides background information related to the present disclosure which is not necessarily prior art.

High-energy density, electrochemical cells, such as lithium ion batteries can be used in a variety of consumer products and vehicles, such as Hybrid Electric Vehicles (HEVs) and Electric Vehicles (EVs). Typical lithium ion batteries comprise a first electrode (e.g., a cathode), a second electrode (e.g., an anode), an electrolyte material, and a separator. Often a stack of lithium ion battery cells are electrically connected to increase overall output. Conventional lithium ion batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a positive electrode (e.g., cathode) to a negative electrode (e.g., anode) during charging of the battery, and in the opposite direction when discharging the battery.

Contact of the anode and cathode materials with the electrolyte can create an electrical potential between the electrodes. When electron current is generated in an external circuit between the electrodes, the potential is sustained by electrochemical reactions within the cells of the battery. Each of the negative and positive electrodes within a stack is connected to a current collector (typically a metal, such as copper for the anode and aluminum for the cathode). During battery usage, the current collectors associated with the two electrodes are connected by an external circuit that allows current generated by electrons to pass between the electrodes to compensate for transport of lithium ions.

Many different materials may be used to create components for a lithium ion battery. By way of non-limiting example, cathode materials for lithium batteries typically comprise an electroactive material which can be intercalated with lithium ions, such as lithium-transition metal oxides or mixed oxides of the spinel type, for example including spinel $LiMn_2O_4$, $LiCoO_2$, $LiNiO_2$, $LiMn_{1.5}Ni_{0.5}O_4$, $LiNi_{(1-x-y)}Co_xM_yO_2$ (where $0<x<1$, $y<1$, and M may be Al, Mn, or the like), or lithium iron phosphates. The electrolyte typically contains one or more lithium salts, which may be dissolved and ionized in a non-aqueous solvent. The negative electrode typically includes a lithium insertion material or an alloy host material. For example, typical electroactive materials for forming an anode include lithium-graphite intercalation compounds, lithium-silicon intercalation compounds, lithium-tin intercalation compounds, or lithium alloys.

The components of the lithium ion battery may include metal contaminants. In certain instances, a difference in potential between the negative electrode and the electrolyte may cause the metal contaminants to form metal dendrites on the negative electrode's surface. The metal dendrites may form protrusions that potentially puncture the separator and cause an internal short circuit. Accordingly, it would be desirable to develop materials for use in high energy lithium ion batteries that reduce metal dendrite formation and similarly suppress or minimize its effects.

SUMMARY

This section provides a general summary of the disclosure, and is not a comprehensive disclosure of its full scope or all of its features.

The present disclosure relates an electrolyte system that suppresses or minimizes metal contaminants and dendrite formation within an electrochemical cell and improves performance thereof.

In various aspects, the present disclosure provides an exemplary electrochemical cell that cycles lithium ions. The electrochemical cell may include a positive electrode, a separator, a negative electrode, and an electrolyte system. The positive electrode may include a positive lithium-based electroactive material, and the negative electrode may include a negative lithium-based electroactive material. The electrolyte system may comprise one or more lithium salts, one or more solvents, and one or more complexing agents. The one or more complexing agents may bind to metal contaminants within the electrochemical cell to form metal ion complex compounds that minimize or suppress the formation of dendrite protrusions on the negative electrode. The one or more complexing agents may be selected from the group consisting of: 1,10-phenanthroline ($C_{12}H_8N_2$), trilithium citrate ($Li_3C_6H_5O_7$), citric acid ($C_6H_8O_7$), dilithium oxalate ($Li_2C_2O_4$), cyanide ($CN^-$), trilithium ethylenediaminetriacetate, 2,2'-bipyridine ($C_{10}H_8N_2$), dimethylglyoxime ($C_4H_8N_2O_2$), porphyrin, meso-tetraphenylporphyrin ($C_{44}H_{30}N_4$), lithium (Li) salts of quinolinic acid ($C_7H_5NO_4$), phthalocyanine ($C_{32}H_{18}N_8$), tetrazaporphyrin, tetrabenzoporphyrin, and combinations thereof.

In one variation, the electrolyte system may include greater than or equal to about 0.1 weight % to less than or equal to about 5 weight % of the one or more complexing agents.

In one variation, the metal ion complex compounds may be insoluble in the one or more solvents of the electrolyte system.

In one variation, less than or equal to about 0.1 grams of the metal ion complex compounds dissolves in greater than or equal to about 100 grams of the one or more solvents.

In one variation, the one or more lithium salts may be selected from the group consisting of: lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium hexafluoroarsenate ($LiAsF_6$); lithium trifluoromethanesulfonate ($LiCF_3SO_3$); lithium fluorosulfonylimide $LiN(FSO_2)_2$ (LIFSI); bis(trifluoromethane)sulfonimide lithium ($LiN(CF_3SO_2)_2$) (LiTFSI); lithium bis-(oxalate)borate $LiB(C_2O_4)_2$ (LiBOB); lithium difluoro-(oxalate)borate $LiBF_2(C_2O_4)$ (LiODFB); $LiPF_4(C_2O_4)$ (LiFOP); $LiNO_3$; and combinations thereof.

In one variation, the one or more solvents may be selected from the group consisting of: cyclic carbonates (e.g., ethylene carbonate (EC), propylene carbonate (PC), butylene carbonate(BC)); acyclic (e.g., linear) carbonates (e.g., dimethyl carbonate (DMC), diethyl carbonate (DEC), ethylmethylcarbonate (EMC)); aliphatic carboxylic esters (e.g., methyl formate, methyl acetate, methyl propionate); γ-lactones (e.g., γ-butyrolactone, γ-valerolactone); chain structure ethers (e.g., 1,2-dimethoxyethane, 1-2-diethoxyethane, ethoxymethoxyethane); cyclic ethers (e.g., tetrahydrofuran, 2-methyltetrahydrofuran); and combinations thereof.

In one variation, the one or more lithium salts may include lithium hexafluorophosphate (LiPF$_6$), and the one or more solvents may include ethylene carbonate (EC), dimethyl carbonate (DMC), and ethyl methyl carbonate (EMC) in a volumetric ratio of about 1:1:1.

In one variation, the metal ion complex compounds are formed in one or more of the negative electrode, positive electrode, and separator.

In one variation, the metal contaminants that bind with the one or more complexing agents may include one or more metal elements selected from the group consisting of: iron (Fe), chromium (Cr), nickel (Ni), manganese (Mn), molybdenum (Mo), cobalt (Co), and combinations thereof.

In one variation, the metal ion complex compounds form a deposited material on one or more exposed surface regions of the negative electrode and the deposited material has an exposed surface that is substantially free of dendrite protrusions.

In a further variation, a height of the deposited material on the one or more exposed surface regions of the negative electrode is less than or equal to about 20 micrometers.

In one variation, the metal ion complex compounds form a layer on one or more exposed surface regions of the negative electrode and the deposited material has a surface that is substantially free of dendrite protrusions.

In other aspects, the present disclosure provides a method of suppressing or minimizing dendrite formation to improve cycling performance and capacity retention in an electrochemical cell, including an electrode, which cycles lithium ions. The method may include introducing an electrolyte system into an electrochemical cell including the electrode. The electrolyte system may include one or more complexing agents, one or more lithium salts, and one or more solvents. The one or more complexing agents may be may be selected from the group consisting of: 1,10-phenanthroline ($C_{12}H_8N_2$), trilithium citrate ($Li_3C_6H_5O_7$), citric acid ($C_6H_8O_7$), dilithium oxalate ($Li_2C_2O_4$), cyanide (CN$^-$), trilithium ethylenediaminetriacetate, 2,2'-bipyridine ($C_{10}H_8N_2$), dimethylglyoxime ($C_4H_8N_2O_2$), porphyrin, meso-tetraphenylporphyrin ($C_{44}H_{30}N_4$), lithium (Li) salts of quinolinic acid ($C_7H_5NO_4$), phthalocyanine ($C_{32}H_{18}N_8$), tetrazaporphyrin, tetrabenzoporphyrin, and combinations thereof. The one or more complexing agents may bind to any metal contaminants within the electrochemical cell to form metal ion complex compounds that minimize or suppress the formation of dendrite protrusions on the electrode.

In one variation, the electrolyte system may include greater than or equal to about 0.1 weight % to less than or equal to about 5 weight % of the one or more complexing agents.

In one variation, the metal ion complex compounds may be insoluble in the one or more solvents of the electrolyte system.

In one variation, less than or equal to about 0.1 grams of the metal ion complex compounds dissolves in greater than or equal to about 100 grams of the one or more solvents.

In one variation, the one or more lithium salts may be selected from the group consisting of: lithium hexafluorophosphate (LiPF$_6$); lithium perchlorate (LiClO$_4$); lithium tetrachloroaluminate (LiAlCl$_4$); lithium iodide (LiI); lithium bromide (LiBr); lithium thiocyanate (LiSCN); lithium tetrafluoroborate (LiBF$_4$); lithium tetraphenylborate (LiB($C_6H_5$)$_4$); lithium hexafluoroarsenate (LiAsF$_6$); lithium trifluoromethanesulfonate (LiCF$_3$SO$_3$); lithium fluorosulfonylimide LiN(FSO$_2$)$_2$ (LIFSI); bis(trifluoromethane)sulfonimide lithium (LiN(CF$_3$SO$_2$)$_2$) (LiTFSI); lithium bis-(oxalate)borate LiB($C_2O_4$)$_2$ (LiBOB); lithium difluoro-(oxalate)borate LiBF$_2$($C_2O_4$) (LiODFB); LiPF$_4$($C_2O_4$) (LiFOP); LiNO$_3$; and combinations thereof.

In one variation, the one or more solvents may be selected from the group consisting of: cyclic carbonates (e.g., ethylene carbonate (EC), propylene carbonate (PC), butylene carbonate(BC)); acyclic (e.g., linear) carbonates (e.g., dimethyl carbonate (DMC), diethyl carbonate (DEC), ethylmethylcarbonate (EMC)); aliphatic carboxylic esters (e.g., methyl formate, methyl acetate, methyl propionate); γ-lactones (e.g., γ-butyrolactone, γ-valerolactone); chain structure ethers (e.g., 1,2-dimethoxyethane, 1-2-diethoxyethane, ethoxymethoxyethane); cyclic ethers (e.g., tetrahydrofuran, 2-methyltetrahydrofuran); and combinations thereof.

In one variation, the one or more lithium salts may include lithium hexafluorophosphate (LiPF$_6$), and the one or more solvents may include ethylene carbonate (EC), dimethyl carbonate (DMC), and ethyl methyl carbonate (EMC) in a volumetric ratio of about 1:1:1.

In one variation, the method further includes forming a deposited material including the metal ion complex compounds on one or more exposed surface regions of the electrode. The deposited material has an exposed surface that is substantially free of dendrite protrusions.

In one further variation, a height of the deposited material on the one or more exposed surface regions of the electrode is less than or equal to about 20 micrometers.

In other aspects, the present disclosure provides a method of forming an electrolyte system for suppressing or minimizing dendrite formation in an electrochemical cell that cycles lithium ions. The method may include preparing an electrolyte system for the electrochemical cell by introducing one or more complexing agents to an electrolyte. The electrolyte may include one or more lithium salts and one or more solvents. The one or more complexing agents may be selected from the group consisting of: tetrasodium or tetralithium salts of ethylenediaminetetraacetate, ethylenediamine ($C_2H_8N_2$), 1,10-phenanthroline ($C_{12}H_8N_2$), trilithium citrate ($Li_3C_6H_5O_7$), citric acid ($C_6H_8O_7$), dilithium oxalate ($Li_2C_2O_4$), cyanide (CN$^-$), trilithium ethylenediaminetriacetate, 2,2'-bipyridine ($C_{10}H_8N_2$), dimethylglyoxime ($C_4H_8N_2O_2$), porphyrin, meso-tetraphenylporphyrin ($C_{44}H_{30}N_4$), lithium (Li) salts of quinolinic acid ($C_7H_5NO_4$), phthalocyanine ($C_{32}H_{18}N_8$), tetrazaporphyrin, tetrabenzoporphyrin, and combinations thereof. The one or more complexing agents are capable of binding to any metal contaminants within the electrochemical cell to form metal ion complex compounds that minimize or suppress the formation of dendrite protrusions on the electrode.

In one variation the electrolyte system comprises greater than or equal to about 0.1 weight % to less than or equal to about 5 weight % of the one or more complexing agents.

In one variation, the metal ion complex compounds may be insoluble in the one or more solvents of the electrolyte system.

In one variation, less than or equal to about 0.1 grams of the metal ion complex compounds dissolves in greater than or equal to about 100 grams of the one or more solvents.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5A:
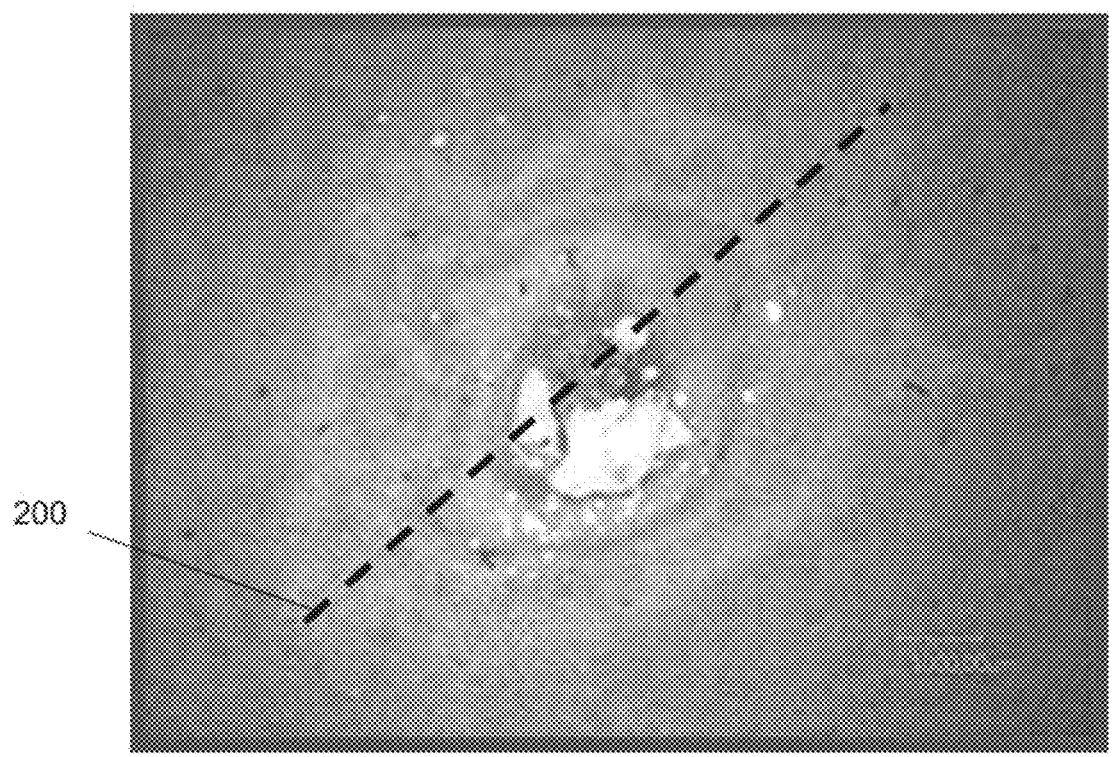
Figure 5B:
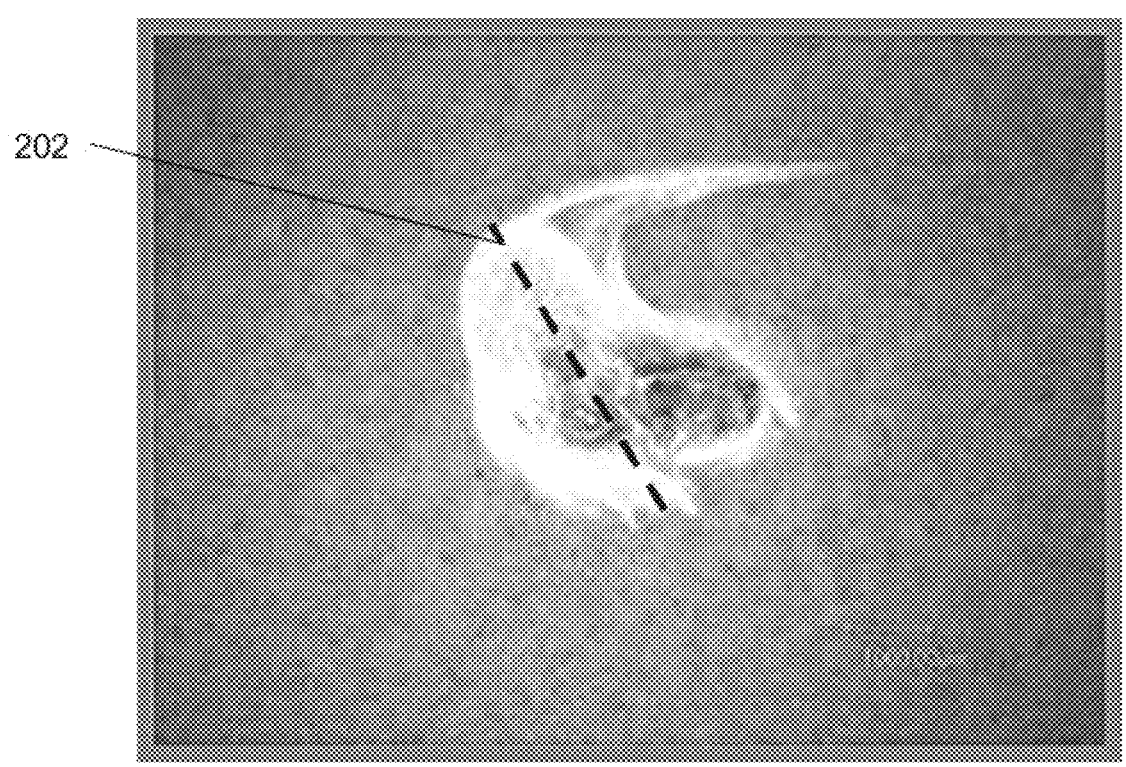

FIG. 5A is a microscopic image of a potential dendrite area of an exemplary electrochemical cell including an electrolyte system having one or more complexing agents prepared in accordance with certain aspects of the present disclosure; and FIG. 5B is a microscopic image of a dendrite area of an exemplary baseline electrochemical cell not including an electrolyte system lacking any complexing agents.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Figure 1:
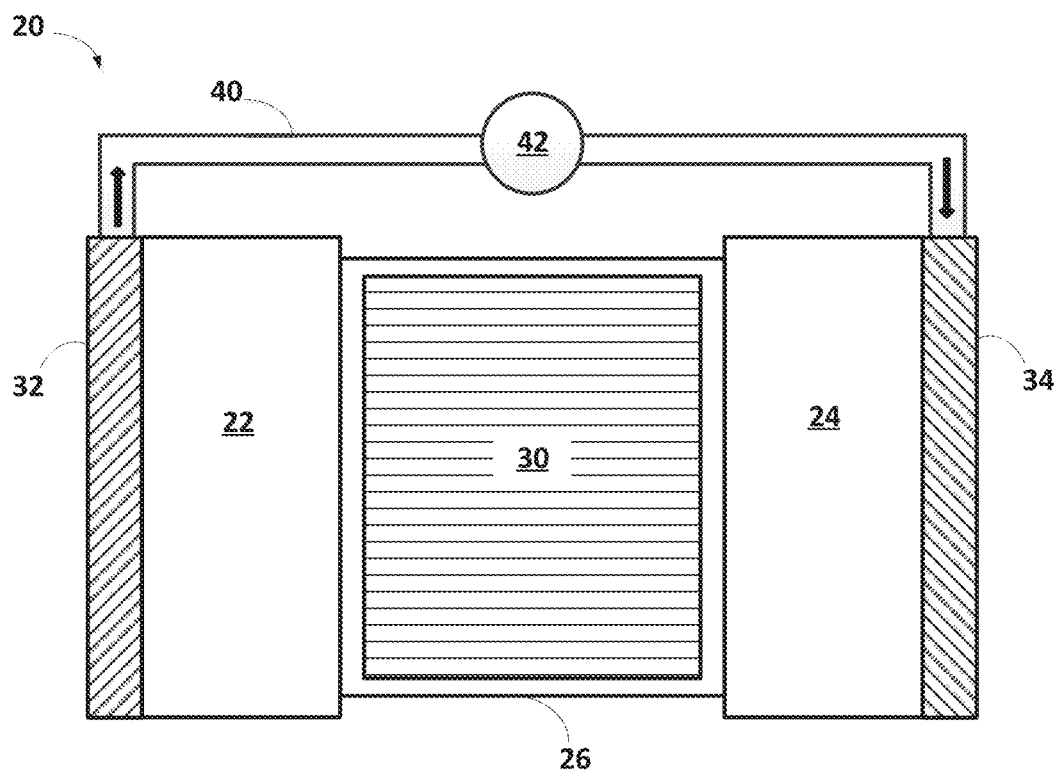
FIG. 1 is a schematic of an exemplary electrochemical cell including an electrolyte system having one or more complexing agents.

An exemplary illustration of an electrochemical cell that cycles lithium ions (e.g., a lithium-ion battery) 20 is shown in FIG. 1. The lithium-ion battery 20 includes a negative electrode 22, a positive electrode 24, and a separator 26 (e.g., a microporous polymeric separator) disposed between the two electrodes 22, 24. A negative electrode current collector 32 may be positioned at or near the negative electrode 22. A positive electrode current collector 34 may be positioned at or near the positive electrode 24. The negative electrode current collector 32 and positive electrode current collector 34 respectively collect and move free electrons to and from an external circuit 40. An interruptible external circuit 40 and load device 42 connects the negative electrode 22 (through its current collector 32) and the positive electrode 24 (through its current collector 34). Each of the negative electrode 22, the positive electrode 24, and the separator 26 may further comprise an electrolyte system 30 capable of conducting lithium ions.

The separator 26 operates as both an electrical insulator and a mechanical support, by being sandwiched between the negative electrode 22 and the positive electrode 24 to prevent physical contact and thus, the occurrence of a short circuit. The separator 26, in addition to providing a physical barrier between the two electrodes 22, 24, may provide a minimal resistance path for internal passage of lithium ions (and related anions) for facilitating functioning of the lithium-ion battery 20.

The lithium-ion battery 20 may generate an electric current during discharge by way of reversible electrochemical reactions that occur when the external circuit 40 is closed (to connect the negative electrode 22 and the positive electrode 24) when the negative electrode 22 contains a relatively greater quantity of intercalated lithium. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte system 30 and separator 26 towards the positive electrode 24. The electrons flow through the external circuit 40 and the lithium ions migrate across the separator 26 in the electrolyte system 30 to form intercalated lithium at the positive electrode 24. The electric current passing through the external circuit 18 may be harnessed and directed through the load device 42 until the intercalated lithium in the negative electrode 22 is depleted and the capacity of the lithium-ion battery 20 is diminished.

The lithium-ion battery 20 may be charged or re-powered at any time by connecting an external power source to the lithium-ion battery 20 to reverse the electrochemical reactions that occur during battery discharge. The connection of an external power source to the lithium-ion battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte system 30 across the separator 26 back towards the negative electrode 22, reunite at the negative electrode 22 and replenish it with intercalated lithium for consumption during the next battery discharge cycle. The external power source that may be used to charge the lithium-ion battery 20 may vary depending on the size, construction, and particular end-use of the lithium-ion battery 20. Some notable and exemplary external power sources include, but are not limited to, an AC wall outlet and a motor vehicle alternator.

In many lithium-ion battery configurations, each of the negative current collector 32, negative electrode 22, the separator 26, positive electrode 24, and positive current collector 34 are prepared as relatively thin layers (for example, several microns or a millimeter or less in thickness) and assembled in layers connected in electrical parallel arrangement to provide a suitable energy package.

Furthermore, the lithium-ion battery 20 may include a variety of other components (not shown). For instance, the lithium-ion battery 20 may include a casing, gaskets, terminal caps, and any other components or materials that may be situated within the lithium-ion battery 20, including between or around the negative electrode 22, the positive electrode 24, and/or the separator 26, by way of non-limiting example. As noted above, the size and shape of the lithium-ion battery 20 may vary depending on the particular application for which it is designed. Battery-powered vehicles and hand-held consumer electronic devices, for example, are two examples where the lithium-ion battery 20 would most likely be designed to different size, capacity, and power-output specifications. The lithium-ion battery 20 may also be connected in series or parallel with other similar lithium-ion cells or batteries to produce a greater voltage output and power density if it is required by the load device 42.

Accordingly, the lithium-ion battery 20 may generate electric current to a load device 42 that can be operatively connected to the external circuit 40. The load device 42 may be powered fully or partially by the electric current passing through the external circuit 40 when the lithium-ion battery 20 is discharging. While the load device 42 may be any number of known electrically-powered devices, a few specific examples of power-consuming load devices include an electric motor for a hybrid vehicle or an all-electrical vehicle, a laptop computer, a tablet computer, a cellular phone, and cordless power tools or appliances, by way of non-limiting example. The load device 42 may also be a power-generating apparatus that charges the lithium-ion battery 20 for purposes of storing energy.

In various instances, the separator 26 may comprise a microporous polymeric separator comprising a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP. In various instances, the separator 26 may include a ceramic coating that increases the safety of the lithium-ion battery 20. The ceramic coating may comprise alumina ($Al_2O_3$), silicon dioxide ($SiO_2$), or combinations thereof.

When the separator 26 is a microporous polymeric separator, it may be a single layer or a multi-layer laminate, which may be fabricated from either a dry or wet process. For example, in certain instances, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. The microporous polymer separator 26 may also comprise other polymers in addition to the polyolefin such as, but not limited to, polyethylene terephthalate (PET), polyvinylidene fluoride (PVDF), and/or a polyamide. The polyolefin layer, and any other optional polymer layers, may further be included in the microporous polymer separator 26 as a fibrous layer to help provide the microporous polymer separator 26 with appropriate structural and porosity characteristics. Various available polymers and commercial products for forming the separator 26 are contemplated, as well as the many manufacturing methods that may be employed to produce such a microporous polymer separator 26.

In various instances, the positive electrode 24 may be formed from any lithium-based active material that can sufficiently undergo lithium intercalation and deintercalation or alloying and dealloying while functioning as the positive terminal of the lithium-ion battery 20. The positive electrode 24 may include a polymeric binder material to structurally fortify the lithium-based active material.

One exemplary common class of materials that may be used to form the positive electrode 24 is layered lithium transitional metal oxides. For example, in various instances, the positive electrode 24 may comprise at least one spinel, like lithium manganese oxide ($Li_{(1+x)}Mn_{(2-x)}O_4$, where $0 \leq x \leq 1$) (e.g., $LiMn_2O_4$); lithium manganese nickel oxide ($LiMn_{(2-x)}Ni_xO_4$, where $0 \leq x \leq 1$) (e.g., $LiMn_{1.5}Ni_{0.5}O_4$); lithium cobalt oxide ($LiCoO_2$); lithium manganese oxide ($LiMn_2O_4$); lithium nickel oxide ($LiNiO_2$); a lithium nickel manganese cobalt oxide ($Li(Ni_xMn_yCo_z)O_2$, where $0 \leq x \leq 1$, $0 \leq y \leq 1$, $0 \leq z \leq 1$, and $x+y+z=1$); a lithium nickel cobalt metal oxide ($LiNi_{(1-x-y)}Co_xM_yO_2$, where $0<x<1$, $y<1$, and M may be Al, Mn, or the like); or a lithium iron polyanion oxide (e.g., lithium iron phosphate ($LiFePO_4$), lithium iron fluorophosphate ($Li_2FePO_4F$)).

A variety of other lithium-based active materials may also be used. By way of non-limiting example, alternative materials may include lithium nickel oxide ($LiNiO_2$), lithium aluminum manganese oxide ($Li_xAl_yMn_{(1-y)}O_2$), and lithium vanadium oxide ($LiV_2O_5$). In certain variations, the positive electrode 24 comprises at least one of spinel, such as lithium manganese oxide ($Li_{(1+x)}Mn_{(2-x)}O_4$), lithium manganese nickel oxide ($LiMn_{(2-x)}Ni_xO_4$, where $0 \leq x \leq 1$), lithium manganese nickel cobalt oxide, (e.g., $LiMn_{1/3}Ni_{1/3}Co_{1/3}O_2$), or a lithium iron polyanion oxide (e.g., lithium iron phosphate ($LiFePO_4$)).

The positive electrode 24 may also include electrically conductive materials that facilitate the movement of the electrons within the positive electrode 24. For example, graphite, carbon-based materials, or a conductive polymer may be used. Carbon-based materials may include by way of non-limiting example ketchen black, denka black, acetylene black, carbon black, and the like. Examples of a conductive polymer include polyaniline, polythiophene, polyacetylene, polypyrrole, and the like. In certain aspects, mixtures of conductive materials may be used.

The positive electrode 24 may also include a polymeric binder to form a composite electrode. Thus, the active materials and optional electrically conductive materials may be intermingled with at least one polymeric binder, for example, by slurry casting active materials with such binders, like polyvinylidene fluoride (PVDF), ethylene propylene diene monomer (EPDM) rubber, carboxymethoxyl cellulose (CMC), styrene-butadiene rubber (SBR), or combinations thereof.

The positive current collector 34 may include a compound selected from the group consisting of: gold (Au), lead (Pb), niobium (Nb), palladium (Pd), platinum (Pt), silver (Ag), aluminum (Al), tantalum (Ta), nickel (Ni), and combinations thereof. The positive current collector 34 may be a continuous layer, such as a foil, or may be grid or mesh, by way of non-limiting example.

In various instances, the negative electrode 22 includes an electroactive material as a lithium host material capable of functioning as a negative terminal of a lithium ion battery. The negative electrode 22 may include the electroactive lithium host material and optionally another electrically conductive material, as well as one or more polymeric binder materials to structurally hold the lithium host material together. For example only, in certain instances, the negative electrode 22 may comprise graphite, lithium titanate oxide ($Li_4Ti_5O_{12}$) (LTO), silicon, silicon-containing alloys, tin-containing alloys, and combinations thereof.

Graphite is often used to form the negative electrode 22 because it exhibits advantageous lithium intercalation and deintercalation characteristics, is relatively non-reactive in the electrochemical cell environment, and can store lithium in quantities that provide a relatively high energy density. Commercial forms of graphite and other graphene materials that may be used to fabricate the negative electrode 22 are available from, by way of non-limiting example, Timcal Graphite and Carbon of Bodio, Switzerland, Lonza Group of Basel, Switzerland, or Superior Graphite of Chicago, United States of America. Other materials can also be used to form the negative electrode 22, including, for example, lithium-silicon and silicon containing binary and ternary alloys and/or tin-containing alloys, such as Si—Sn, SiSnFe, SiSnAl, SiFeCo, $SnO_2$, and the like. In certain alternative embodiments, lithium-titanium anode materials are contemplated, such as $Li_{4+x}Ti_5O_{12}$, where $0 \leq x \leq 3$, including lithium titanate ($Li_4Ti_5O_{12}$) (LTO). Any of these negative electroactive materials may of course be combined with other electroactive materials.

The negative electrode 22 may also include electrically conductive materials that facilitate the movement of the electrons within the negative electrode 22. Graphite, carbon-based materials, or a conductive polymer may be used. Carbon-based materials may include by way of non-limiting example ketchen black, denka black, acetylene black, carbon black, and the like. Examples of a conductive polymer include polyaniline, polythiophene, polyacetylene, polypyrrole, and the like. In certain aspects, mixtures of conductive materials may be used.

The electroactive materials comprising the negative electrode 22 may be intermingled with at least one polymeric binder, for example, by slurry casting the electroactive materials with such binders, like halogenated hydrocarbon polymers (such as poly(vinylidene chloride) and poly((dichloro-1,4-phenylene)ethylene), fluorinated urethanes, fluorinated epoxides, fluorinated acrylics, copolymers of halogenated hydrocarbon polymers, epoxides, ethylene propylene diamine termonomer (EPDM), ethylene propylene diamine termonomer (EPDM), polyvinylidene difluoride (PVDF), hexafluoropropylene (HFP), ethylene acrylic acid copolymer (EAA), ethylene vinyl acetate copolymer (EVA), EAA/EVA copolymers, PVDF/HFP copolymers, and combinations thereof.

The negative electrode current collector 32 may include a compound selected from the group consisting of: gold (Au), lead (Pb), niobium (Nb), palladium (Pd), platinum (Pt), silver (Ag), vanadium (V), tin (Sn), aluminum (Al), copper (Cu), tantalum (Ta), nickel (Ni), iron (Fe), and combinations thereof. The negative current collector 32 may be a continuous layer, such as a foil, or may be grid or mesh, by way of non-limiting example.

Each of the negative electrode 22, the positive electrode 24, and the separator 26 may include an electrolyte system 30 capable of conducting lithium ions. In particular, the electrolyte system 30 may be capable of conducting lithium ions between the negative electrode 22 and the positive electrode 24. The electrolyte system 30 may include one or more lithium salts, one or more solvents, and one or more complexing agents. In various aspects, the electrolyte system 30 minimizes or suppresses dendrite formation that may result from metal contaminants within the lithium ion battery 20. Sources of contaminants may include one or more metal elements such as iron (Fe), chromium (Cr), nickel (Ni), manganese (Mn), molybdenum (Mo), cobalt (Co), or other such metal elements. In certain aspects, the metal elements may result from stainless steel interfusion during the cell manufacturing process or from the lithium-based active material of the positive electrode.

The lithium salt in the electrolyte system 30 may be selected from the group consisting of: lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium hexafluoroarsenate ($LiAsF_6$); lithium trifluoromethanesulfonate ($LiCF_3SO_3$); lithium fluorosulfonylimide $LiN(FSO_2)_2$ (LIFSI); bis(trifluoromethane)sulfonimide lithium ($LiN(CF_3SO_2)_2$) (LiTFSI); lithium bis-(oxalate)borate $LiB(C_2O_4)_2$ (LiBOB); lithium difluoro-(oxalate)borate $LiBF_2(C_2O_4)$ (LiODFB); $LiPF_4(C_2O_4)$ (LiFOP); $LiNO_3$; and combinations thereof. In certain variations, the one or more lithium salts may comprise lithium hexafluorophosphate ($LiPF_6$). The one or more lithium salts may be present at greater than or equal to about 10% to less than or equal to 20% by mass of the electrolyte system 30.

The one or more solvents (e.g., cosolvents) in the electrolyte system 30 may be selected from the group consisting of: cyclic carbonates (e.g., ethylene carbonate (EC), propylene carbonate (PC), butylene carbonate(BC)); acyclic (e.g., linear) carbonates (e.g., dimethyl carbonate (DMC), diethyl carbonate (DEC), ethylmethylcarbonate (EMC)); aliphatic carboxylic esters (e.g., methyl formate, methyl acetate, methyl propionate); γ-lactones (e.g., γ-butyrolactone, γ-valerolactone); chain structure ethers (e.g., 1,2-dimethoxyethane, 1-2-diethoxyethane, ethoxymethoxyethane); cyclic ethers (e.g., tetrahydrofuran, 2-methyltetrahydrofuran); and combinations thereof. In certain variations, the one or more solvent may comprise equal parts (e.g., 1:1:1) of ethylene carbonate (EC), dimethyl carbonate (DMC), and ethylmethylcarbonate (EMC). The one or more solvents may be present at greater than or equal to about 80% to less than or equal to 90% by mass of the electrolyte system 30.

The one or more complexing agents in the electrolyte system 30 may be sodium (Na) or lithium (Li) salt compounds. In certain variations, the one or more complexing agents may by selected from the group consisting of: tetrasodium or tetralithium salts of ethylenediaminetetraacetate (e.g., $Na_4EDTA$ or $Li_4EDTA$, $Na_4C_{10}H_{12}N_2O_8$ or $Li_4C_{10}H_{12}N_2O_8$), ethylenediamine ($C_2H_8N_2$), 1,10-phenanthroline ($C_{12}H_8N_2$), trilithium citrate ($Li_3C_6H_5O_7$), citric acid ($C_6H_8O_7$), dilithium oxalate ($Li_2C_2O_4$), cyanide ($CN^-$), trilithium ethylenediaminetriacetate, 2,2'-bipyridine ($C_{10}H_8N_2$), dimethylglyoxime ($C_4H_8N_2O_2$), porphyrin, meso-tetraphenylporphyrin ($C_{44}H_{30}N_4$), lithium (Li) salts of quinolinic acid ($C_7H_5NO_4$), phthalocyanine ($C_{32}H_{18}N_8$), tetrazaporphyrin, tetrabenzoporphyrin, and combinations thereof. The one or more complexing agents may be present in an amount greater than or equal to about 0.1 weight % to less than or equal to about 5 weight % of the electrolyte system 30.

In various aspects, the one or more complexing agents bind with metal contaminants throughout the lithium-ion battery 20 to form metal ion complex compounds. By binding with metal contaminants throughout the lithium-ion battery 20, the one or more complexing agents minimizes or suppresses formation of dendrite protrusions on the negative electrode. For example, in various instances, the formed metal ion complex compounds are insoluble in the one or more solvents and metal dendrite formation is thereby substantially prohibited. For example only, in certain instances, less than or equal to about 0.1 grams of the one or more metal ion complex compound(s) may be dissolved in greater than or equal to about 100 grams of the one or more solvents. In other instances, the formed metal ion complex compounds may be soluble in the one or more solvents. In such instances, the concentration of metal contaminants may be reduced as a result of the binding of the one or more complexing agents and the metal contaminants to form metal ion complex compounds and metal dendrite formation is thereby substantially slowed and the horizontal formation area of the metal dendrite increased.

Figure 2:
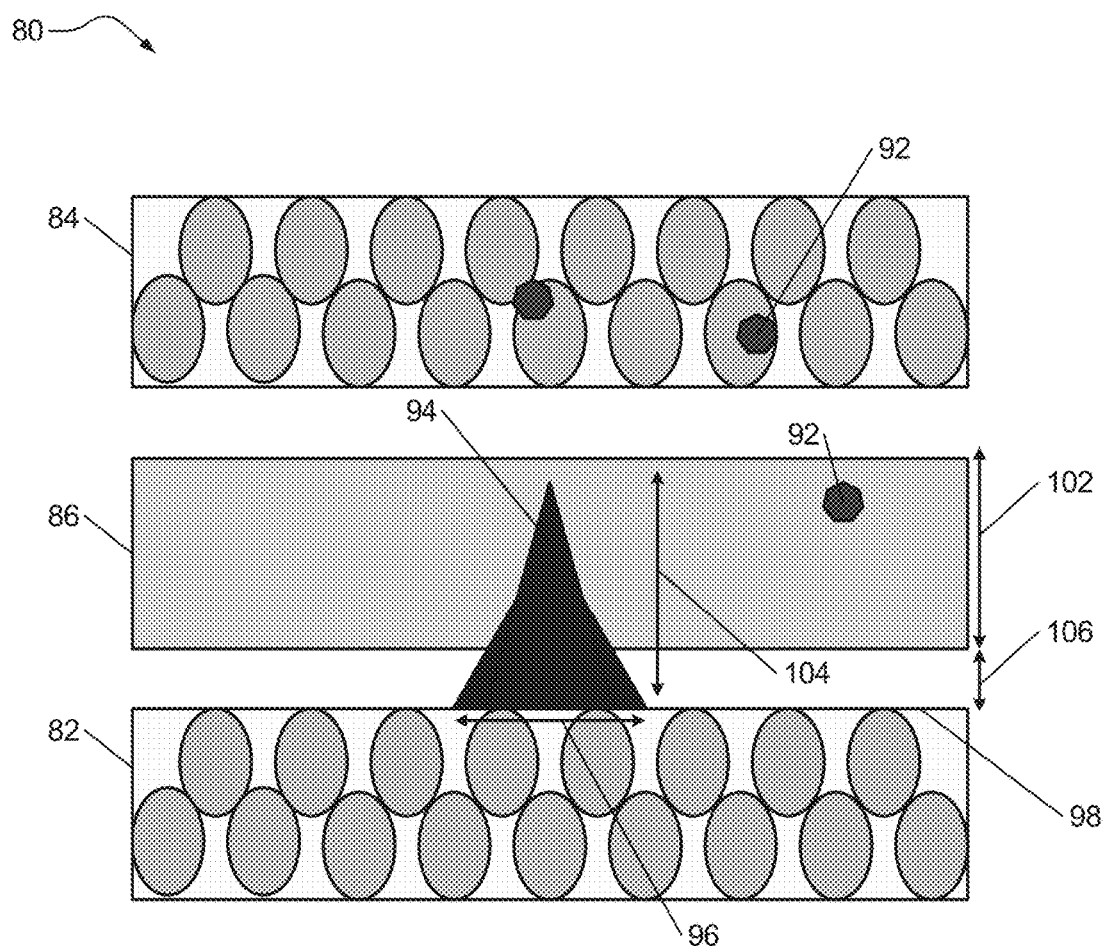
FIG. 2 is a schematic of an exemplary baseline electrochemical cell having an electrolyte system that lacks any complexing agents.

As background, FIG. 2 illustrates metal dendrite formation in an electrochemical cell 80 (e.g., lithium ion battery) comprising a negative electrode 82 (e.g., anode), a positive electrode 84 (e.g., cathode), and a separator 86 disposed between the two electrodes 82, 84, each having a composition corresponding with that described above. The negative electrode 82, the positive electrode 84, and the separator 86 may each include an electrolyte system capable of conducting lithium ions. However, the electrolyte system does not include the one or more complexing agents described above. Electrolyte system includes one or more lithium salts and one or more solvents as detailed above. In such instances, metal contaminants 92 within the electrochemical cell 80 may accumulate and form a metal dendrite 94 on one or more exposed surface regions 98 of the negative electrode 82. For example, metal contaminants 92 (e.g., monomers or compounds) may oxidize within the positive electrode 84 because of the high potential therein to form metal ions that will dissolve in the electrolyte. The dissolved metal ion may be transferred via the electrolyte to the negative electrode 82 to form the metal dendrite by depositing on the negative electrode 82 because of the low potential therein. The metal dendrites 94 may have a pointed or protruding shape that can penetrate and potentially puncture through the separator 86. The metal dendrite 94 protruding into the separator 86 may introduce electronic conductivity between the positive electrode 84 and the negative electrode 82 that can result in short circuiting and failure of the electrochemical cell 80. For example, in certain instances, the metal dendrite 94 may have a narrow base (e.g., horizontal area) 96 and a height greater than the distance 106 between the negative electrode 82 and the separator 86. For example only, in certain instances the separator may have a height 102 of about 20 µm and the metal dendrite 94 may have a height 104 of greater than or equal to about 20 µm.

Figure 3:
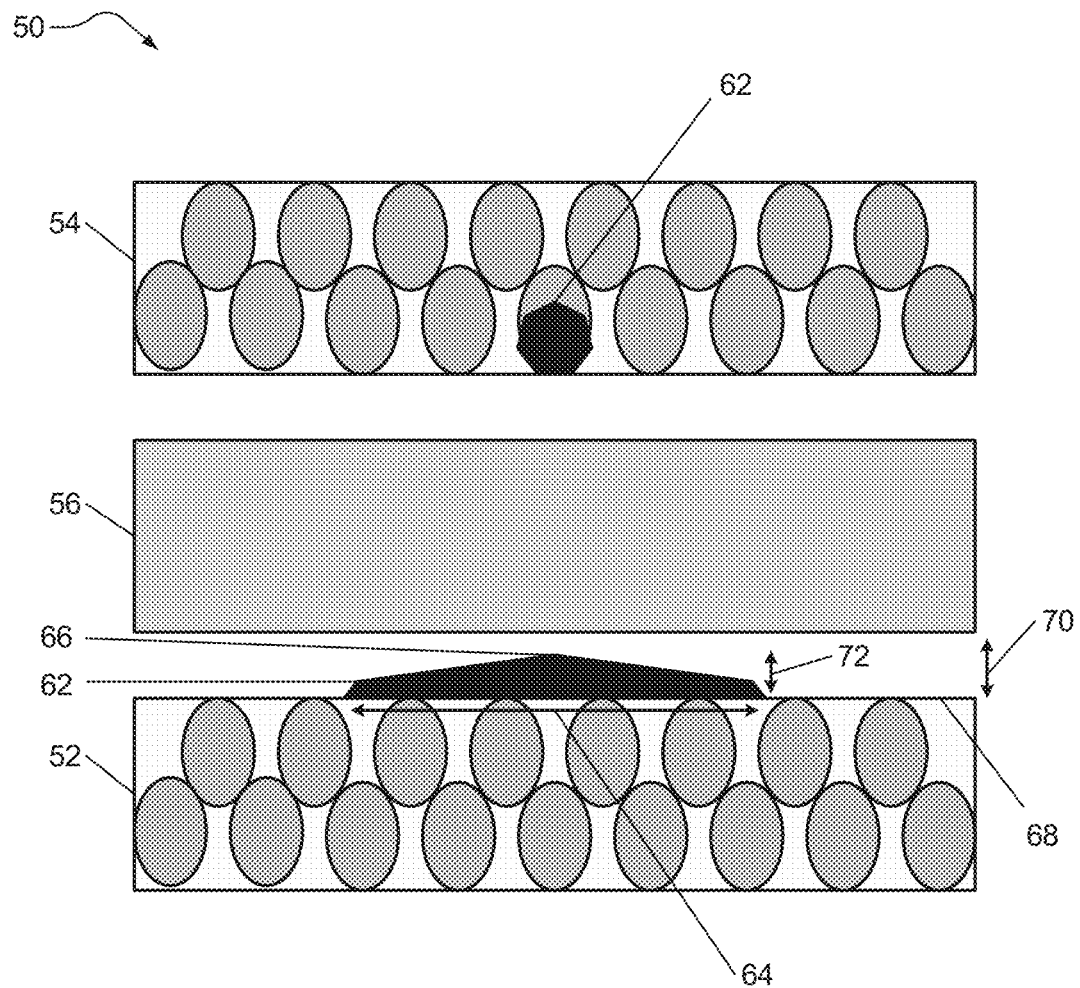
FIG. 3 is a schematic of another exemplary electrochemical cell including an electrolyte system having one or more complexing agents prepared in accordance with certain aspects of the present disclosure.

FIG. 3 illustrates an electrochemical cell 50 (e.g., lithium ion battery) formed in accordance with certain aspects of the present disclosure including a negative electrode 52 (e.g., anode), a positive electrode 54 (e.g., cathode), and a separator 56 disposed between the two electrodes 52, 54, each having a composition corresponding with that described above. The negative electrode 52, the positive electrode 54, and the separator 56 may each include an electrolyte system capable of conducting lithium ions. In various aspects, the electrolyte system minimizes or suppresses dendrite formation that may result from metal contaminants within the electrochemical cell 50. The electrolyte system may include one or more lithium salts, one or more solvents, and one or more complexing agents as detailed above. The one or more complexing agents may bind with metal contaminants throughout the electrochemical cell 50 to form metal ion complex compounds 62.

By binding with metal contaminants throughout the electrochemical cell 50, the one or more complexing agents minimize or suppress formation of metal dendrites (e.g., metal dendrites 94 on the negative electrode 82 as shown in FIG. 2) that protrude sharply into the separator 86 and, for at least this reason, reduces internal short circuiting. For example, formation of the metal ion complex compounds 62 may decrease the concentration of metal contaminants available for oxidation and incorporation within the electrolyte and thereby available for transport to the negative electrode 52 for the formation of a metal dendrite. Thus, the formation of metal dendrite is substantially slowed. The metal ion complex compounds 62 that travel to the negative electrode 52 may form a deposited metal material 66 that agglomerates or forms on an extended horizontal area 64 of one or more exposed surface regions 68 of the negative electrode 52. While not being limited to any particular theory, it is believed that the metal ion complex compounds 62 may form a deposited metal material 66 that agglomerates or forms an extended horizontal area 64 because of the reduced potential of the metal ion complex compounds 62 as compared to the oxidized ions in FIG. 2. In certain aspects, the deposited metal material 66 may have a height 72 that is substantially less than the height of the metal dendrite 94 seen in FIG. 2 and, therefore, the deposited metal material 66 avoids tall dendrite protrusions that could contact and damage the separator 56. The deposited metal material 66 may have a surface profile that is relatively smooth and avoids dendrite protrusions with pointed or spiked shapes. Thus, while the deposited metal material 66 may form what is considered to be a dendrite-like structure, the deposited metal material 66 generally avoids forming tall and pointed dendrite protrusions that may damage the separator 56. In certain instances, as shown in FIG. 3, the deposited metal material 66 may have a height 72 that is less than the distance 70 between a surface of the negative electrode 52 and the separator 56, for example, less than or equal to about 20 micrometers. In this manner, the formation of metal ion complex compounds in accordance with various aspects of the present disclosure serves to minimize or suppress formation of dendrite protrusions on the negative electrode.

Embodiments of the present technology are further illustrated through the following non-limiting examples.

Example 1

Figure 4:
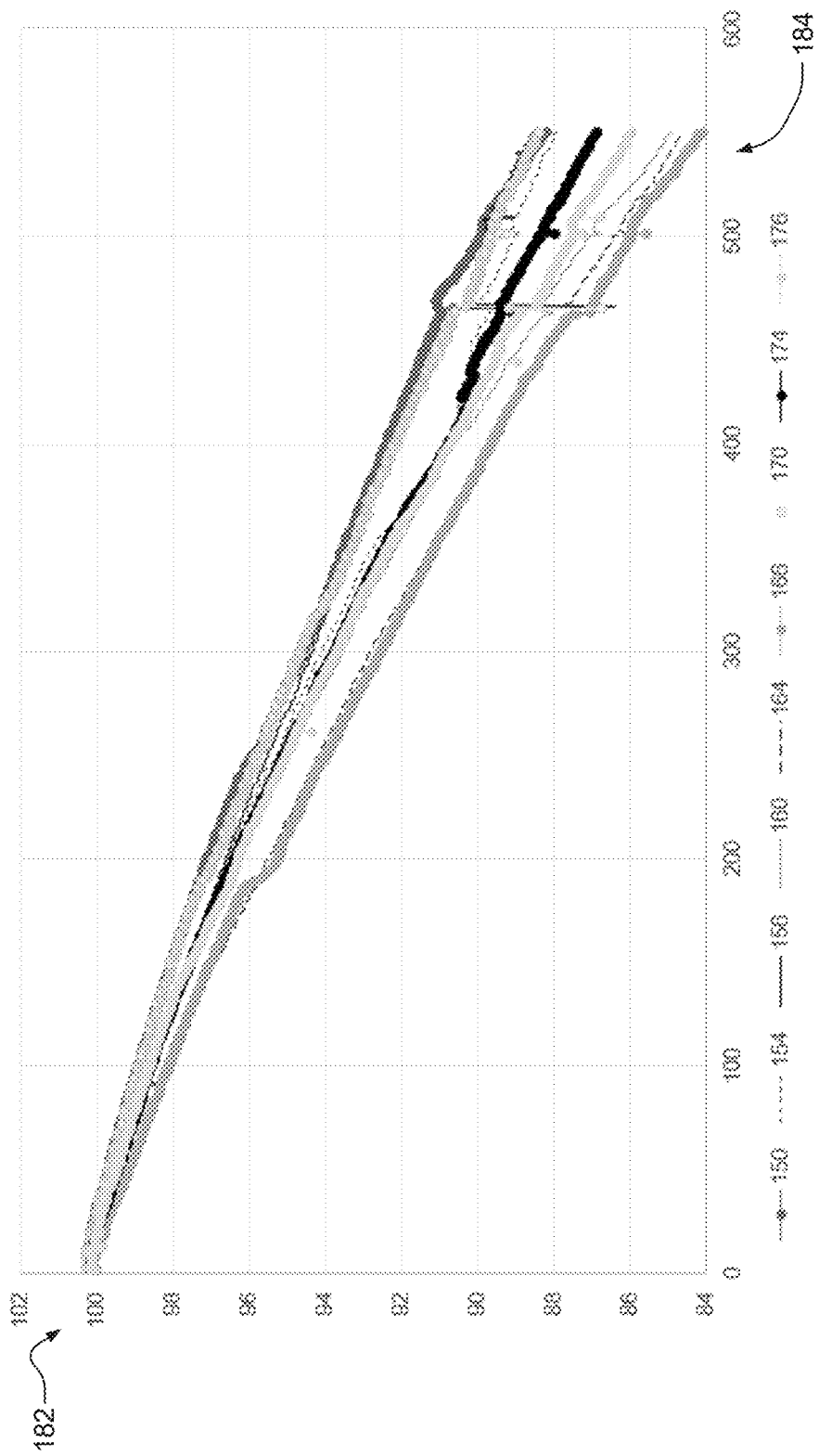
FIG. 4 is a graphical illustration of the capacity retention per cycle of exemplary electrochemical cells.

FIG. 4 shows the charging and discharging profiles (e.g., cycle life) of electrochemical cells based on graphite/NMC (1 Ah), including comparative electrolyte systems, at voltages greater than or equal to about 2.7V and less than or equal to about 4.2V and about 35° C. The y-axis 182 depicts the capacity retention in percent (%), while the cycle number is shown on the x-axis 184.

Electrochemical cells 170, 174, and 176 (e.g., experimental electrochemical cells) include respective electrolyte systems prepared in accordance with certain aspects of the present disclosure. In particular, the electrolyte systems of the electrochemical cells 170, 174, 176 include about 0.1 weight % citric acid ($C_6H_8O_7$) as the complexing agent; lithium hexafluorophosphate ($LiPF_6$) as the lithium salt; and co-solvents ethylene carbonate (EC), dimethyl carbonate (DMC), and ethylmethylcarbonate (EMC) in a volumetric ratio of about 1:1:1. The respective cathodes of electrochemical cells 170, 174, and 176 each include iron (Fe) particle contaminates having a diameter of about 200 µm.

Electrochemical cells 160, 164, and 166 (e.g., baseline electrochemical cells) include respective electrolyte systems comprising lithium hexafluorophosphate ($LiPF_6$) and co-solvents ethylene carbonate (EC), dimethyl carbonate (DMC), and ethylmethylcarbonate (EMC) in a volumetric ratio of about 1:1:1. The respective cathodes of electrochemical cells 160, 164, and 166 each include iron (Fe) particle contaminates having a diameter of about 200 µm.

Electrochemical cells 150, 154, and 156 (e.g., blank electrochemical cells) include respective electrolyte systems comprising lithium hexafluorophosphate ($LiPF_6$) and co-solvents ethylene carbonate (EC), dimethyl carbonate (DMC), and ethylmethylcarbonate (EMC) in a volumetric ratio of about 1:1:1.

As seen electrochemical cells 170, 174, and 176 have improved performance over electrochemical cells 160, 164, and 166. After 550 cycles, electrochemical cells 170, 174, and 176 have superior performance (e.g., higher capacity retention) over electrochemical cells 160, 164, and 166. In particular, the electrolyte systems of electrochemical cells 170, 174, and 176 reduce dendrite formation in the respective cells 170, 174, and 176 and thereby improve cycling performance and capacity retention. Accordingly, electrochemical cells 170, 174, and 176 prepared in accordance with certain aspects of the present disclosure show significant improved cycling performance and reduced capacity fade.

Further, the electrolyte systems of electrochemical cells 170, 174, and 176 suppress the otherwise detrimental effects of metal contaminants (e.g., iron) by causing dendrite formation, if any, to occur on extended areas of one or more exposed surface regions of the respective negative electrodes. For example, FIG. 5A depicts the horizontal area or length 200 of the metal dendrite formation in electrochemical cell 170, while FIG. 5B depicts the horizontal area or length 202 of the metal dendrite formation in electrochemical cell 160. As seen, the horizontal area 200 of the metal dendrite formation in electrochemical cell 170 (FIG. 5A) is larger than the horizontal area 202 of the metal dendrite formation in electrochemical cell 160. In particular, extended area 200 has a horizontal length or area of about 7000 µm, while narrow area 202 has a horizontal length or area of about 3000 µm. Further, the strength of the white portions or materials evidenced in FIGS. 5A and 5B are indicative of the amount or quantity of metal dendrite formed on the respective electrochemical cells 170 and 160. As seen, the strength of the white material is less in FIG. 5A than in FIG. 5B. According, electrochemical cell 170 prepared in accordance with certain aspects of the present disclosure shows significant reduction in total metal dendrite formation. The reduced dendrite coupled with an extend horizontal area of metal dendrite formation minimizes or suppresses the formation of dendrites that protrude into the separator and cause short-circuits. Accordingly, electrochemical cells 170, 174, and 176 have improved cycling performance.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrochemical cell that cycles lithium ions comprising:
   a positive electrode comprising a positive lithium-based electroactive material;
   a separator;
   a negative electrode comprising a negative electroactive material; and
   an electrolyte system comprising one or more lithium salts, one or more solvents, and one or more complexing agents that bind to metal contaminants within the electrochemical cell to form metal ion complex compounds,
   wherein the one or more complexing agents are selected from the group consisting of: trilithium citrate, citric acid, dimethylglyoxime, porphyrin, meso-tetraphenylporphyrin, lithium salts of quinolinic acid, tetraporphyrin, tetrabenzoporphyrin, and combinations thereof, and
   the metal ion complex compounds form a deposited material on one or more exposed surface regions on the negative electrode that are substantially free of dendrite protrusions in the form of points or spikes on the negative electrode.

2. The electrochemical cell of claim 1, wherein the electrolyte system comprises greater than or equal to about 0.1 weight % to less than or equal to about 5 weight % of the one or more complexing agents.

3. The electrochemical cell of claim 1, wherein the metal ion complex compounds are formed in one or more of the negative electrode, positive electrode, and separator.

4. The electrochemical cell of claim 1, wherein the metal contaminants that bind with the one or more complexing agents include one or more metal elements selected from the group consisting of: iron (Fe), chromium (Cr), nickel (Ni), manganese (Mn), molybdenum (Mo), cobalt (Co), and combinations thereof.

5. The electrochemical cell of claim 1, wherein a height of the deposited material on the one or more exposed surface regions of the negative electrode is less than or equal to about 20 micrometers.

6. The electrochemical cell of claim 1, wherein the one or more lithium salts are selected from the group consisting of: lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium hexafluoroarsenate ($LiAsF_6$); lithium trifluoromethanesulfonate ($LiCF_3SO_3$); lithium fluorosulfonylimide $LiN(FSO_2)_2$ (LIFSI); bis(trifluoromethane)sulfonimide lithium ($LiN(CF_3SO_2)_2$) (LiTFSI); lithium bis-(oxalate)borate $LiB(C_2O_4)_2$ (LiBOB); lithium difluoro-(oxalate)borate $LiBF_2(C_2O_4)$ (LiODFB); $LiPF_4(C_2O_4)$ (LiFOP); $LiNO_3$; and combinations thereof.

7. The electrochemical cell of claim 1, wherein the one or more solvents are selected from the group consisting of: ethylene carbonate, propylene carbonate, butylene carbonate, dimethyl carbonate, diethyl carbonate, ethylmethylcarbonate, methyl formate, methyl acetate, methyl propionate, γ-butyrolactone, γ-valerolactone, 1,2-dimethoxyethane, 1-2-diethoxyethane, ethoxymethoxyethane, tetrahydrofuran, 2-methyltetrahydrofuran, and combinations thereof.

8. The electrochemical cell of claim 1, wherein the one or more lithium salts comprises lithium hexafluorophosphate ($LiPF_6$), and the one or more solvents comprise ethylene carbonate (EC), dimethyl carbonate (DMC), and ethyl methyl carbonate (EMC) in a volumetric ratio of about 1:1:1.

9. A method of suppressing or minimizing dendrite formation improving cycling performance and capacity retention in an electrochemical cell that cycles lithium ions, the method comprising:
   introducing an electrolyte system into the electrochemical cell comprising an electrode,
   wherein the electrolyte system comprises one or more complexing agents, one or more lithium salts, and one or more solvents,
   wherein the one or more complexing agents are selected from the group consisting of trilithium citrate, citric acid, dimethylglyoxime, porphyrin, meso-tetraphenylporphyrin, lithium salts of quinolinic acid, tetraporphyrin, tetrabenzoporphyrin, and combinations thereof,
   wherein after the introducing, the one or more complexing agents of the electrolyte system bind to any metal contaminants within the electrochemical cell to form metal ion complex compounds that form a deposited material on one or more surface regions on the electrode that are substantially free of dendrite protrusions in the form of points or spikes on the electrode.

10. The method of claim 9, wherein the electrolyte system comprises greater than or equal to about 0.1 weight % to less than or equal to about 5 weight % of the one or more complexing agents.

11. The method of claim 9, wherein a height of the deposited material on the one or more exposed surface regions of the electrode is less than or equal to about 20 micrometers.

12. The method of claim 9, wherein the one or more lithium salts are selected from the group consisting of: lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium hexafluoroarsenate ($LiAsF_6$); lithium trifluoromethanesulfonate ($LiCF_3SO_3$); lithium fluorosulfonylimide $LiN(FSO_2)_2$ (LIFSI); bis(trifluoromethane)sulfonimide lithium ($LiN(CF_3SO_2)_2$) (LiFSI); lithium bis-(oxalate)borate $LiB(C_2O_4)_2$ (LiBOB); lithium difluoro-(oxalate)borate $LiBF_2(C_2O_4)$ (LiODFB); $LiPF_4(C_2O_4)$ (LiFOP); $LiNO_3$; and combinations thereof; and the one or more solvents are selected from the group consisting of: ethylene carbonate, propylene carbonate, butylene carbonate, dimethyl carbonate, diethyl carbonate, ethylmethylcarbonate, methyl formate, methyl acetate, methyl propionate, γ-butyrolactone, γ-valerolactone, 1,2-dimethoxyethane, 1-2-diethoxyethane, ethoxymethoxyethane, tetrahydrofuran, 2-methyltetrahydrofuran, and combinations thereof.

13. The method of claim 9, wherein the one or more lithium salts comprise lithium hexafluorophosphate (LiPF$_6$), and the one or more solvents comprise ethylene carbonate (EC), dimethyl carbonate (DMC), and ethyl methyl carbonate (EMC) in a volumetric ratio of about 1:1:1.

14. A method of forming an electrolyte system for suppressing or minimizing dendrite formation in an electrochemical cell that cycles lithium ions, the method comprising:

preparing an electrolyte system for the electrochemical cell that comprises an electrode by introducing one or more complexing agents to an electrolyte comprising one or more lithium salts and one or more solvents, wherein the one or more complexing agents are selected from the group consisting of trilithium citrate, citric acid, dimethylglyoxime, porphyrin, meso-tetraphenylporphyrin, lithium salts of quinolinic acid, tetraporphyrin, tetrabenzoporphyrin, and combinations thereof, wherein the one or more complexing agents of the electrolyte system are capable of binding to any metal containments within the electrochemical cell to form metal ion complex compounds that form a deposited material on one or more surface regions of the electrode that are substantially free of dendrite protrusions in the form of points or spikes on the electrode.

15. The method of claim 14, wherein the electrolyte system comprises greater than or equal to about 0.1 weight % to less than or equal to about 5 weight % of the one or more complexing agents.

* * * * *